US008035734B2

(12) United States Patent
Jones

(10) Patent No.: US 8,035,734 B2
(45) Date of Patent: Oct. 11, 2011

(54) SELF-BALANCING REMOTE SENSING DEVICE AND REMOTE SENSING SYSTEM COMPRISING SAME

(76) Inventor: Kenneth R Jones, Wayne, NJ (US)

(*) Notice: Subject to any disclaimer, the term of this patent is extended or adjusted under 35 U.S.C. 154(b) by 0 days.

(21) Appl. No.: 12/761,619

(22) Filed: Apr. 16, 2010

(65) Prior Publication Data

US 2010/0194914 A1 Aug. 5, 2010

Related U.S. Application Data

(63) Continuation-in-part of application No. 11/731,940, filed on Apr. 2, 2007, now Pat. No. 7,733,418.

(51) Int. Cl.
*H04N 5/225* (2006.01)
(52) U.S. Cl. ...... 348/373; 348/81; 348/155; 348/211.99
(58) Field of Classification Search ............. 348/45, 348/65, 81, 144, 155, 211.99, 211.1, 211.2, 348/207.99, 77–78, 84–85, 373; 441/135
See application file for complete search history.

(56) References Cited

U.S. PATENT DOCUMENTS

| | | | | |
|---|---|---|---|---|
| 5,644,078 A * | 7/1997 | Ahdoot | | 73/178 R |
| 5,749,909 A * | 5/1998 | Schroeppel et al. | | 607/33 |
| 6,131,595 A * | 10/2000 | Cook | | 137/12 |
| 6,145,393 A * | 11/2000 | Canton | | 74/5.43 |
| 6,711,095 B1 * | 3/2004 | Daniels | | 367/134 |
| 7,518,641 B2 * | 4/2009 | Mashitani et al. | | 348/231.6 |
| 7,577,283 B2 * | 8/2009 | Zinaty et al. | | 382/128 |
| 7,637,865 B2 * | 12/2009 | Iddan et al. | | 600/130 |
| 7,733,418 B2 * | 6/2010 | Kaplan et al. | | 348/373 |
| 2004/0127785 A1 * | 7/2004 | Davidson et al. | | 600/407 |
| 2005/0215233 A1 * | 9/2005 | Perera et al. | | 455/411 |
| 2007/0125289 A1 * | 6/2007 | Asfar et al. | | 114/312 |
| 2007/0180482 A1 * | 8/2007 | Frink et al. | | 725/105 |
| 2008/0057822 A1 * | 3/2008 | Curtis et al. | | 446/153 |
| 2008/0192576 A1 * | 8/2008 | Vosburgh et al. | | 367/134 |

* cited by examiner

*Primary Examiner* — Tuan Ho
*Assistant Examiner* — Kent Wang
(74) *Attorney, Agent, or Firm* — Townsend & Banta

(57) ABSTRACT

A self-balancing remote sensing device, and a system comprised of the remote sensing devices and one or more base stations, is provided for remotely monitoring both terrestrial and maritime environments. Specifically, a spherically-shaped self-balancing remote sensing device having one or more cameras and various sensors is provided, which may ascend and descend within the water column as desired, by altering its buoyancy, while maintaining proper orientation of the camera and sensors. Further, the remote sensing system comprised of the devices and base stations is provided, wherein the devices and base stations may form an ad hoc network, thereby greatly extending the range and coverage of the system. The devices, due to their small size, may be quickly and easily deployed using various vehicles, including flight vehicles, land-based vehicles, water craft, and subsurface water vehicles.

4 Claims, 12 Drawing Sheets

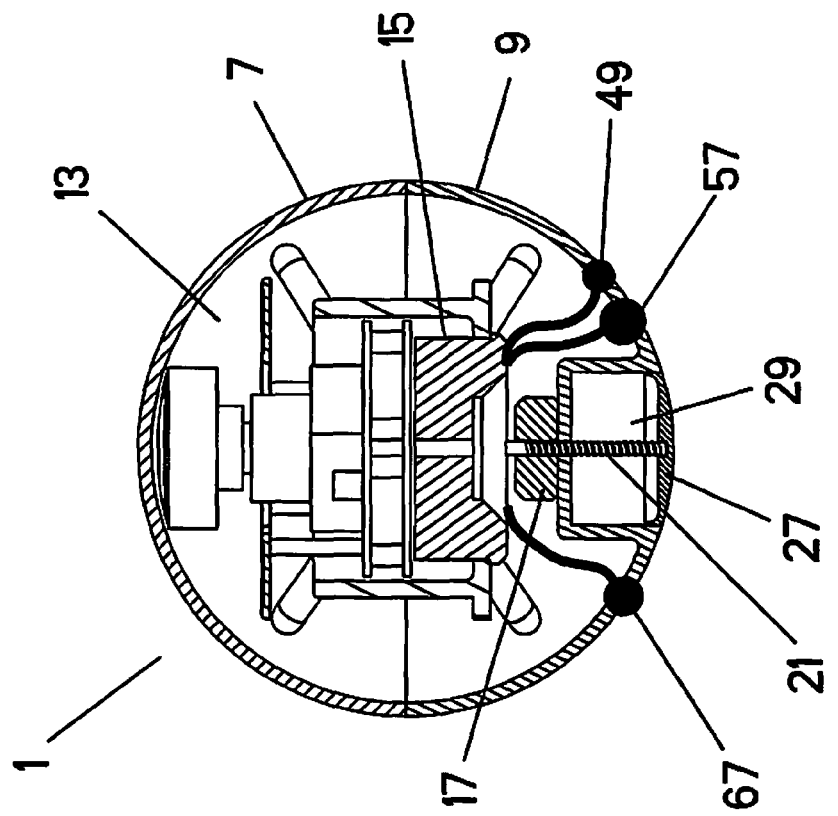
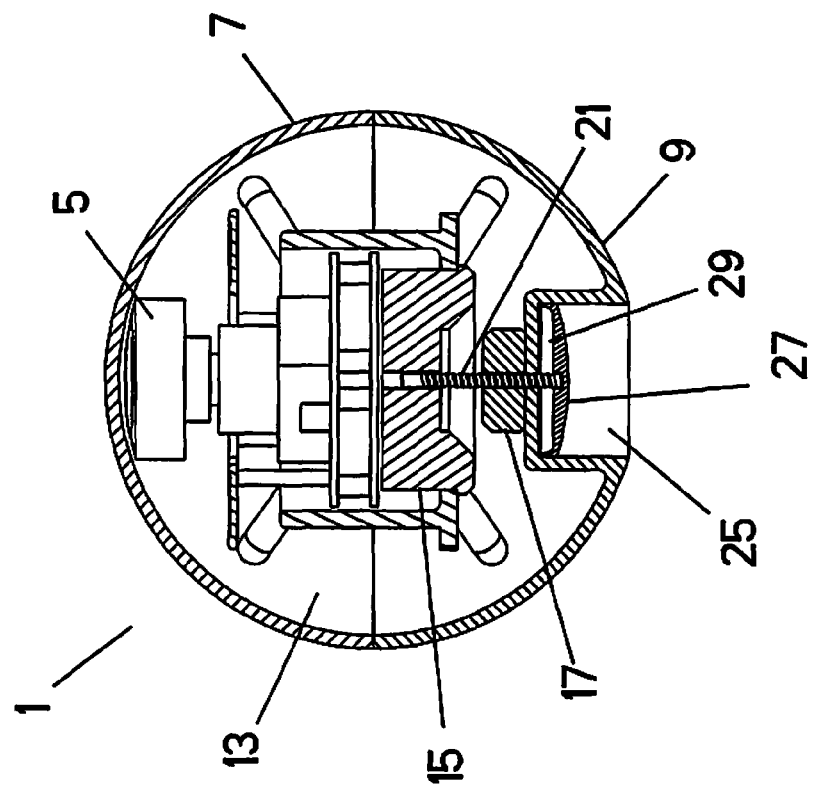
FIGURE 5
FIGURE 4

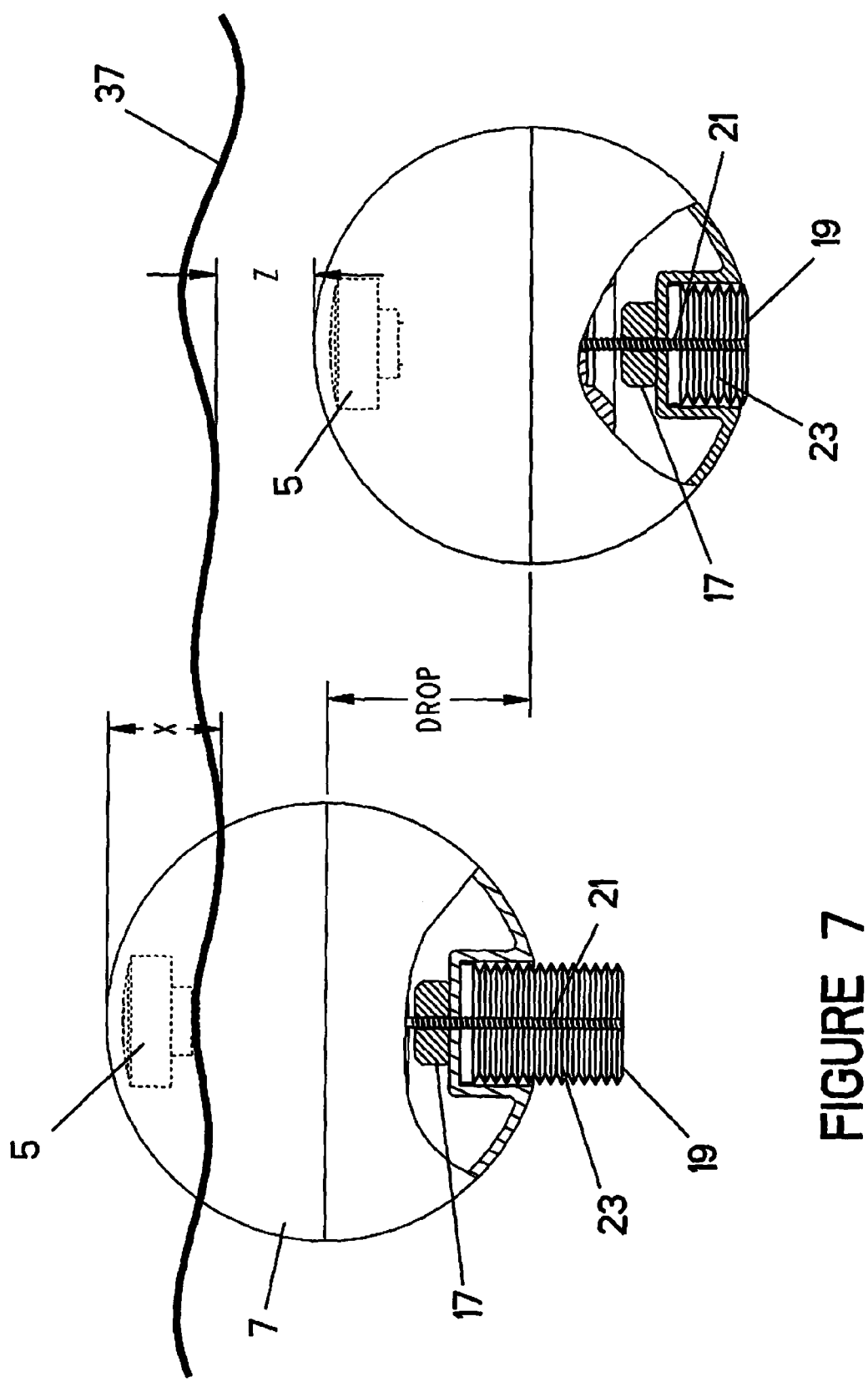

SELF-BALANCING REMOTE SENSING DEVICE AND REMOTE SENSING SYSTEM COMPRISING SAME

REFERENCE TO RELATED APPLICATION

The present application is a continuation-in-part application of copending application Ser. No. 11/731,940, filed Apr. 2, 2007, now allowed, the contents of which are incorporated herein by reference.

FIELD OF THE INVENTION

A self-balancing remote sensing device, and a system comprising same, is provided for remotely monitoring both terrestrial and maritime environments. Specifically, a self-balancing remote sensing device having a camera and various sensors is provided, which may ascend and descend within the water column as desired, by altering its buoyancy, while maintaining proper orientation of the camera and sensors. Further, a remote sensing system comprised of the device is provided, the devices therein being capable of forming an ad hoc network to extend the range/coverage of the system.

DESCRIPTION OF THE RELATED ART

Some conventional video camera systems, for use in surveillance, etc., are comprised of a bottom-weighted single sphere that can be thrown into a structure for inspection thereof. The sphere has a camera mounted thereon, that is turned upright (into a position on the uppermost surface of the sphere when the sphere is resting on a surface) due to gravity. However, if the sphere comes to rest upon an uneven, high friction, or soft surface, often the sphere fails to roll upright. In particular, conventional self-righting configurations for such conventional spheres have failed to overcome many commonly encountered difficulties, as the conventional spheres rely upon the movement of the external shell (housing) of the device to move relative to the resting surface.

Further, previous approaches and devices therefor have been taken to monitoring oceanic/maritime environments, such as the station keeping maneuverable articulating autonomous regenerative tactical (smaart) buoy disclosed in U.S. Pat. No. 7,390,233, and the free-floating altitude stabilized system disclosed in U.S. Pat. No. 6,577,556. However, none of these conventional devices/systems is capable of descending and ascending in a controlled manner in the water column while reliably orienting a camera and sensors above the water surface to monitor maritime environments. Further, the current devices and systems are incapable of autonomous ad hoc networking to form networks of sensors operable to monitor large maritime or terrestrial areas.

In order to overcome the disadvantages of the conventional video camera and remote monitoring systems described above, it is an object of the present invention to provide a self-balancing remote sensing device and system comprised thereof. Further, it is an object of the present invention to provide such a system wherein the remote sensing devices are operable to be deployed in both terrestrial and maritime environments, and are capable of ad hoc networking.

SUMMARY OF THE INVENTION

In order to achieve the objects of the present invention as discussed above, the present inventor earnestly endeavored to develop a remote sensing device and system comprised of same, capable of being quickly and easily deployed in virtually any environment, and operable to monitor a myriad of parameters, including but not limited to visual, acoustic, environmental and chemical/radiological parameters. Accordingly, in a first embodiment of the present invention, a self-balancing remote sensing device is provided comprising:

(a) a hollow outer sphere, at least a portion of which is comprised of a transparent material, said sphere defining an interior portion;

(b) an inner structure disposed within the interior portion of the hollow outer sphere, the inner structure having three or more projections formed integral therewith or attached thereto, each of said projections having one or more races and/or ball bearings rollably disposed at, in or adjacent to an end of the projection, or low friction surface formed at the end of the projection, so as to enable the inner structure to freely roll within the hollow outer sphere;

(c) a computer processor attached to and/or indirectly supported by the inner structure;

(d) a computer readable medium in communication with the computer processor;

(e) a video camera and/or digital camera in communication with the computer processor, said video camera and/or digital camera having a lens disposed adjacent a portion of the hollow outer sphere being comprised of a transparent material;

(f) a GPS receiver in communication with the computer processor;

(g) a transceiver in communication with the computer processor, said transceiver operable to wirelessly transmit photographic and/or video images and geographic location data; and (h) a power supply in conductive communication with the computer processor, wherein the inner structure is balanced such that the video camera and/or digital camera tend to rotate into an upright position by the action of gravitational forces acting upon the device.

Further, the self-balancing remote sensing device of the first embodiment above may comprise various sensors, which are preferably in communication with the computer processor so as to be operable to transmit sensed data thereto. For example, the device may comprise one or more of depth control sensors, motion detectors, acoustic sensors, chemical sensors, radiation detectors/sensors (such as Geiger counters), neutron detectors, temperature sensors (thermometers), light meters, and pressure sensors.

In a further embodiment, a buoyancy control means is provided in direct or indirect attachment with the inner structure, and communication with the computer processor. This allows the buoyancy control means to be operable to alter the buoyancy of the remote sensing device so as to cause the remote sensing device to descend or ascend in the water column. Further, the buoyancy control means may be operable to maintain a low profile/low level of detection/exposure, so as to provide covert capabilities when desired. For example, based upon the received sensed data, the device may actuate the buoyancy control means in a manner such that only a minimal portion of the sphere extends above the water surface; the sphere descends during daylight hours, etc.

In a first preferred embodiment, the buoyancy control means is comprised of a chamber disposed within the interior portion of the hollow outer sphere, or formed integral with the hollow outer sphere; a piston disposed within the chamber; an actuator means in communication with the piston; and a motor means in communication with the actuator means and computer processor, said motor means operable to actuate the actuate means upon command by the computer processor so as to drive the piston back and forth within the chamber to alter the buoyant volume of the remote sensing device, thereby altering the buoyancy of the device.

In a another preferred embodiment of the buoyancy control means, the buoyancy control means is comprised of: a chamber disposed within the interior portion of the hollow outer sphere, or formed integral with the hollow outer sphere; a bellows disposed within the chamber; an actuator means in communication with the bellows; and a motor means in communication with the actuator means and computer processor, said motor means operable to actuate the actuator means upon command by the computer processor so as to extend and retract the bellows to alter the buoyant volume of the remote sensing device, thereby altering the buoyancy of the device.

In a further preferred embodiment, the self-balancing remote sensing device of the first embodiment above may further comprise a valve disposed within or adjacent to the hollow outer sphere, the valve being operable to permit flow of liquid and/or gases into and/or out of the hollow outer sphere. The valve is in communication with the computer processor, so as to enable intelligent control thereof.

In another preferred embodiment, the self-balancing remote sensing device of the present invention comprises a charging mechanism for charging the power supply. For example, the power supply may be inductively charged, charged via a piezoelectric device, or charged via solar panels. Further, the self-balancing remote sensing device may also have illumination means provided thereon, to enable detection of the device when needed.

In a preferred embodiment, a mobile computer program product is provided, which is stored on the computer readable storage medium, said computer program product embodying computer usable program code for receiving and processing data received by one or more of the cameras and sensors, said computer program product operable to:
  receive one or more of video, photographic, geographic and sensor data;
  execute commands stored on the computer readable storage medium; and
  transmit commands to one or more of the cameras, sensors, buoyancy control means, illumination devices and valve.

In a further preferred embodiment, the mobile computer program product mentioned above is further operable to:
  receive external commands;
  authenticate received external commands; and
  execute external commands.

In another preferred embodiment, as mentioned above, the mobile computer program product is further operable to receive and store data received from other remote sensing devices, and transmit same in peer-to-peer communications. These functions enable the devices to form ad hoc networks of remote sensing devices. Further, the mobile computer program product is preferably operable to delete stored data upon determination of one or more predefined parameters or upon receipt of an authenticated external command, and/or transmit an open/close command to the valve so as to permit inflow or outflow of gases and/or liquids.

In addition, a remote sensing system is provided, comprised of the remote sensing devices described above, and one or more stationary and/or mobile base stations, wherein each base station is operable to receive one or more of video, photographic, geographic and sensor data transmitted from one or more of the remote sensing devices. The remote sensing system further preferably comprises a video display means in communication with the central computer processor, and a base computer program product stored on the central computer readable database embodying computer usable program code for managing data received from one or more of the base stations and/or from one or more of the remote sensing devices.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

FIG. 4 is a cross-sectional view of the piston/piston cavity embodiment of the self-balancing remote sensing device of the present invention, illustrating the piston in the retracted position, so as to minimize buoyancy of the device.

FIG. 5 is a cross-sectional view of the self-balancing remote sensing device shown in FIG. 4, illustrating the piston in the fully extended position, so as to maximize buoyancy of the device.

FIG. 7 is a partially cut away side view of the self-balancing remote sensing device of the present invention, illustrating the device in a buoyant disposition in water, wherein the buoyancy bellows are fully extended so as to raise the camera above the water surface.

FIG. 8 is a partially cut away side view of the self-balancing remote sensing device shown in FIG. 7, wherein the buoyancy bellows are retracted so as to decrease the buoyancy of the device, thereby lowering the device below the water surface.

DETAILED DESCRIPTION OF THE INVENTION

Figure 1:
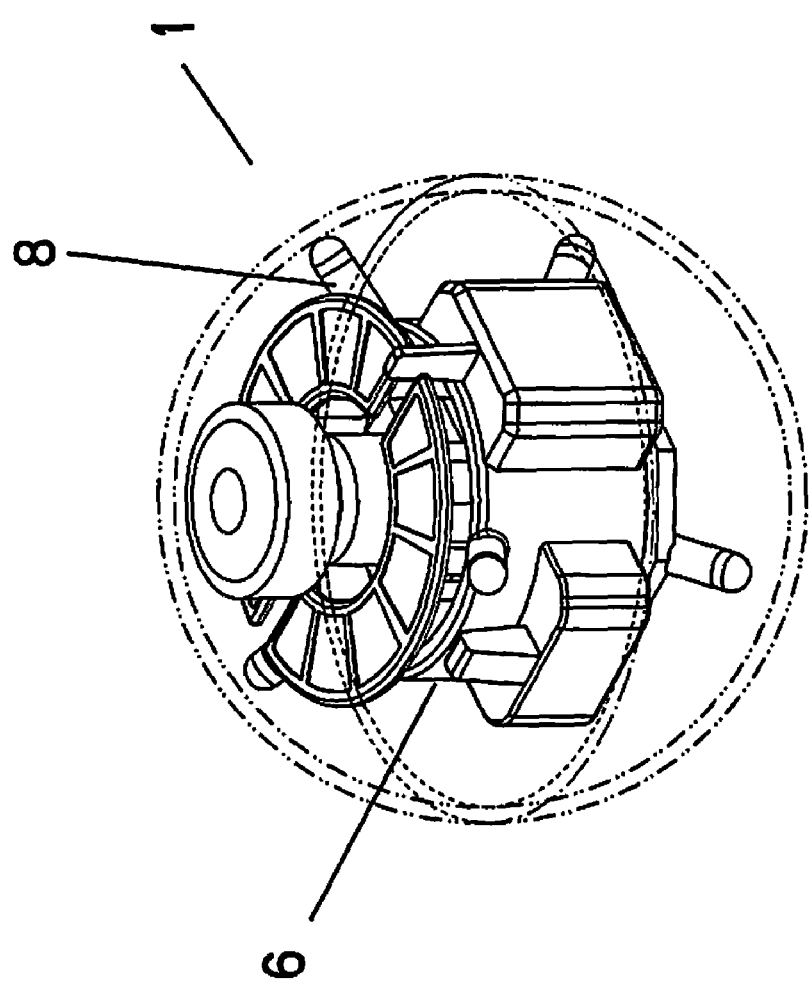
FIG. 1 is a partially transparent perspective view of the self-balancing remote sensing device of the present invention, illustrating the inner structure of the device.
Figure 2:
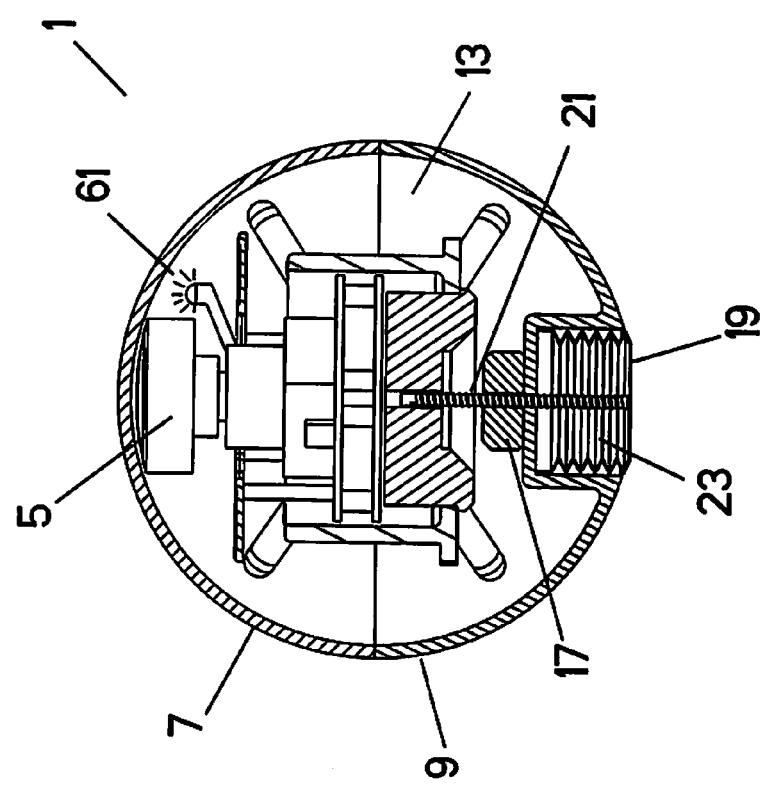
FIG. 2 is a cross-sectional view of the buoyancy bellows embodiment of the self-balancing remote sensing device of the present invention, illustrating the buoyancy bellows in a retracted position, so as to minimize buoyancy of the device.

As illustrated in FIG. 1, the present invention provides a self-balancing remote sensing device 1 comprised of a hollow outer sphere, the sphere defining an inner volume 13, as shown in FIG. 2. Generally, as shown in FIGS. 2-5, the hollow outer sphere is comprised of an upper hemisphere 7 and a lower hemisphere 9, thus allowing the sphere to be opened to access the internal components. At least a portion of the upper hemisphere is made of a transparent material, such as a clear plastic/polymer material, so as to allow clear viewing of the surrounding environment via the camera 5.

As illustrated in FIG. 1, an inner structure 6 is disposed within the interior portion 13 of the hollow outer sphere, the inner structure 6 having three or more projections 8 formed integral therewith or attached thereto. Each of the projections 8 has one or more roller contacts 45 rollably disposed at or in an end of the projection 8 so as to enable the inner structure 6 to roll freely within the hollow outer sphere. Preferably, the roller contacts 45 are races and/or ball bearings, but may also simply be low friction surfaces, as long as the surface enables free movement of the inner structure 6 relative to the hollow outer sphere. Via proper weighting of the inner structure 6, i.e., weighting the inner structure 6 such that the bottom portion is heavier than the top portion, gravitational forces cause the inner structure to roll into an upright position, i.e., a position wherein the camera 5 is disposed adjacent the uppermost portion of the hollow outer sphere, regardless of the position of the sphere.

Figure 10:
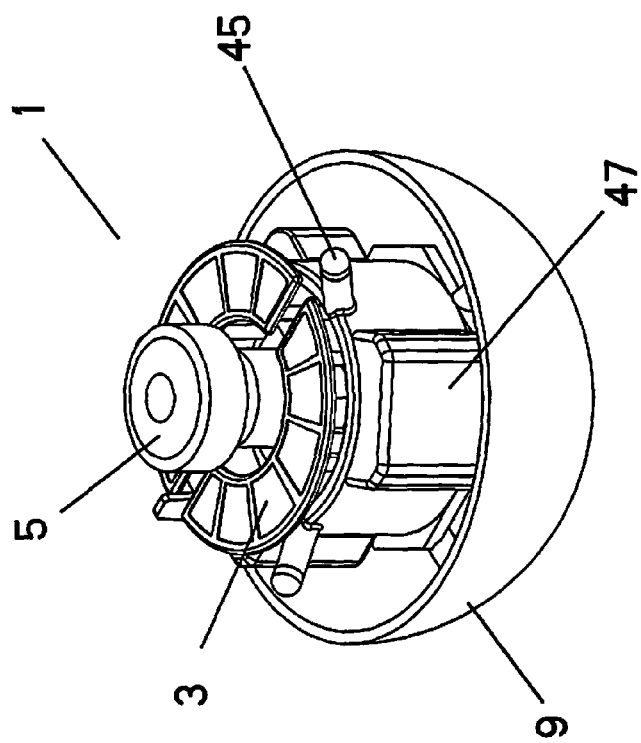
FIG. 10 is a partial perspective view of the self-balancing remote sensing device of the present invention, illustrating the disposition of the solar panels and camera within the device.

As illustrated in FIG. 10, a computer processor is attached to and/or supported by the inner structure 6. The computer processor may be any conventional CPU or programmable logic capable of executing the mobile computer program product mentioned above. Additionally, preferably, a computer readable medium is provided, which may be any computer-usable or computer readable medium or apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. For example, the computer readable medium may be, but is not limited to flash memory, semiconductor or solid state memory, magnetic tape, a removable computer diskette, a random access memory (RAM), a read-only memory (ROM), a rigid magnetic disk and an optical disk.

As mentioned above, and as illustrated in FIGS. 2-4 and 6-8, a camera 5 is provided, which may be comprised of one or more of a conventional video camera and/or digital still camera, so as to record and transmit photographic and video data of the surrounding environment back to one or more base stations and/or to other devices in the network/system. The camera may further be an IR (infrared camera) operable to record in the IR spectrum, or thermal imaging camera. The camera 5 is in communication with the computer processor 47. The inner structure 6 and camera 5 are weighted/disposed such that inner structure rotates within the hollow outer sphere such that the lens of the camera 5 is naturally disposed adjacent the portion of the hollow outer sphere comprised of a transparent material.

In a further preferred embodiment, the camera 5 is rotatable or tiltable, and/or the lens is zoomable, so as to allow an operator to focus in on targets of interest. In such an embodiment, a conventional video/photo control means (now shown) is provided in communication with the lens of the camera 5, to allow precise control of the movement of the camera 5 and/or zooming of the lens. The video/photo control means is in direct and/or indirect conductive communication with the computer processor 47.

Figure 11:
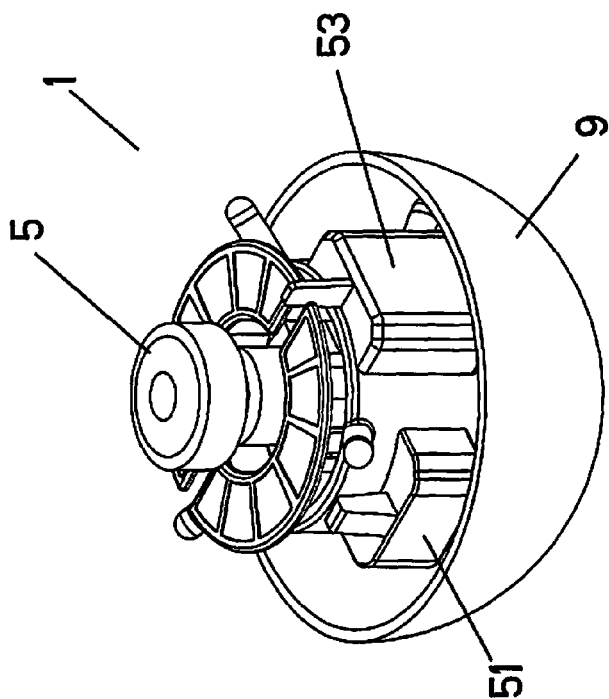
FIG. 11 is a partial perspective view of the self-balancing remote sensing device shown in FIG. 10, illustrating the disposition of GPS receiver and transceiver within the device.

Further, as illustrated in FIG. 11, a GPS receiver 51 and transceiver 53, both in communication with the computer processor 47, are disposed within the inner volume 13 of the device 1. These components allow the device 1 to determine the location of the device, transmit geographic data based on same, and wirelessly transmit photographic, video images and geographic location data to mobile or stationary base stations or to one another in an ad hoc network configuration, respectively.

Figure 6:
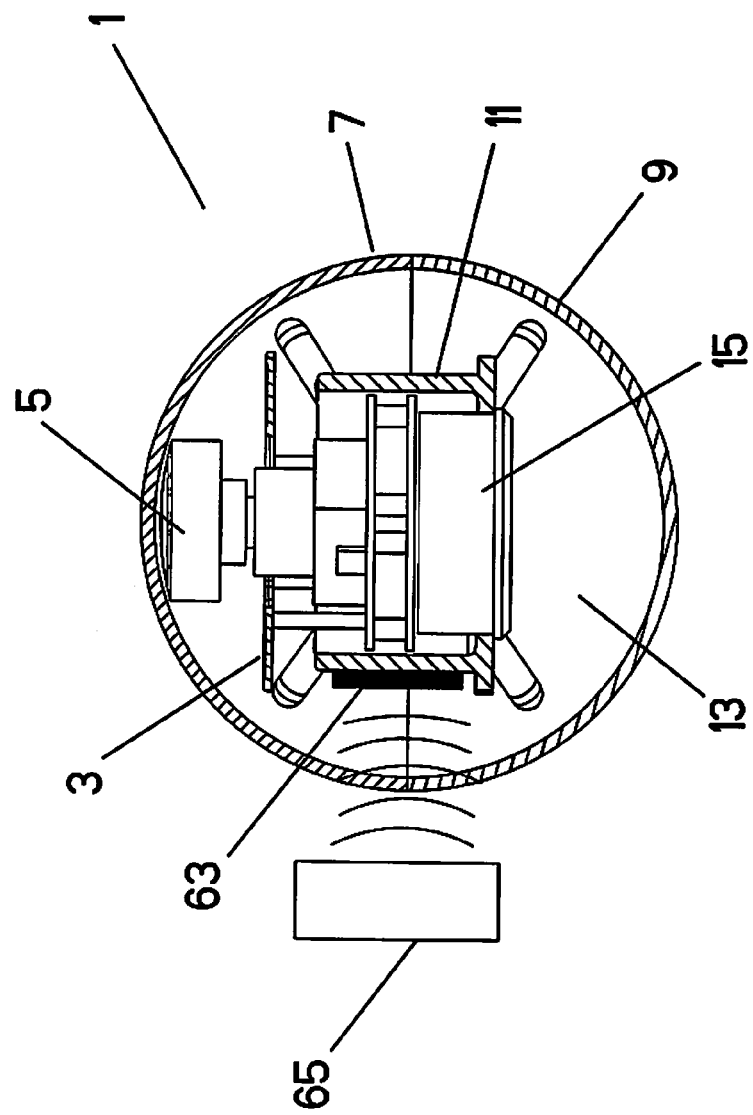
FIG. 6 is a cross-sectional view of the self-balancing remote sensing device of the present invention and the induction charger operable to inductively charge the battery of the device through the hollow outer sphere, without unsealing same.

A power supply 15, as illustrated in FIGS. 4-6, is provided to power the device 1. The power supply 15, which is in conductive communication with the computer processor, acts as both a battery and ballast weight (although additional ballast weight may be added when needed or desired). The power supply may be comprised of any conventional means of supplying electrical power. In a preferred embodiment, the power supply 15 is one or more of a battery and a fuel cell. To charge same, as illustrated in FIG. 6, the device 1 may be provided with an inductive charging pad 63 in conductive communication with the power supply 15. This configuration allows the power supply 15 to be charged before or after deployment without unsealing the hollow outer sphere or without providing external contacts. Alternatively, the sphere may be unsealed and the power supply 15 charged in a conventional manner.

Figure 3:
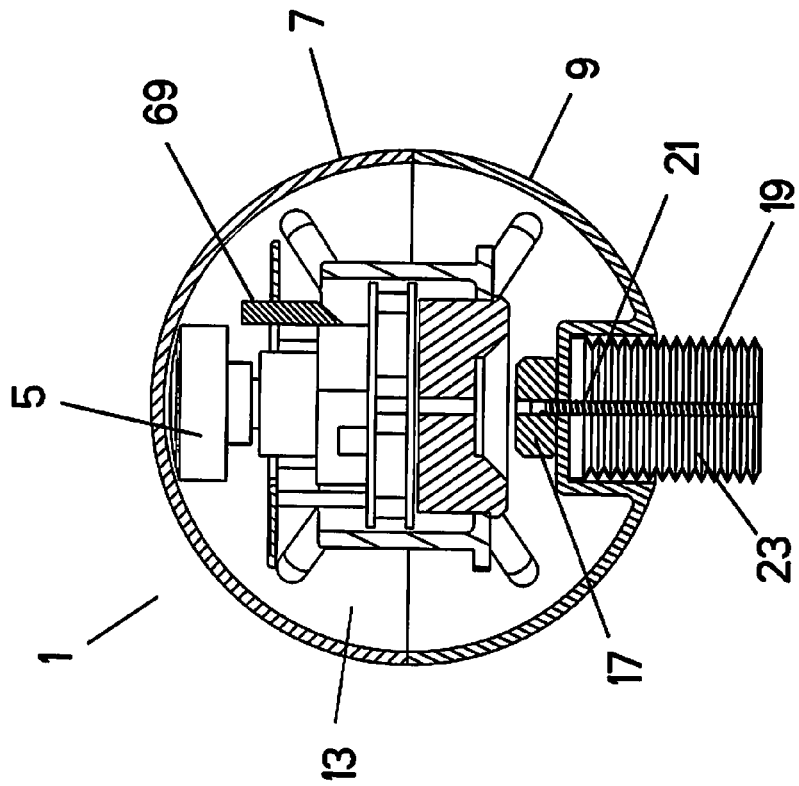
FIG. 3 is a cross-sectional view of the self-balancing remote sensing device of the present invention shown in FIG. 2, illustrating the buoyancy bellows in an extended (inflated) position, so as to increase buoyancy of the device.

In a preferred alternative embodiment, the device 1 may comprise a conventional piezoelectric device in conductive communication with the power supply 15, the piezoelectric device configured so as to recharge (trickle charge) the power supply as the piezoelectric device is shaken via wave action/movement. In a further preferred embodiment, as illustrated in FIGS. 3 and 10, one or more solar panels may be disposed within the inner volume 13 of the sphere adjacent the transparent portion thereof, and in conductive communication with the power supply 15. The solar panels provide a reliable, fairly constant means for recharging the power supply 15.

One or more depth control and/or salinity sensors 57 are provided to control the position of the self-balancing remote sensing device 1 within the water column. All sensors, including the depth control sensors and/or salinity sensors, in communication with the computer processor, so as to relay sensed data thereto. Based on this data, the computer processor may control/alter the buoyancy of the device 1, causing same to ascend and descend as needed/desired. In a preferred embodiment, one or more additional sensors is provided on/within the device 1, such as acoustic, chemical, radiation, neutron, temperature, light meter, and pressure sensors. Like the depth control and/or salinity sensors, all additional sensors are in communication with the computer processor, so as to transmit sensed data thereto. The computer processor may alter the buoyancy of the device 1 based on any sensed data relayed thereto. For example, the device 1 may be programmed to descend during daylight hours, which may be determined by analysis of sensed data received by the light meter, or ascend to the surface only upon detection of predetermined acoustic signatures, which may be determined by analysis of sensed data received from the acoustic sensor.

Figure 9:
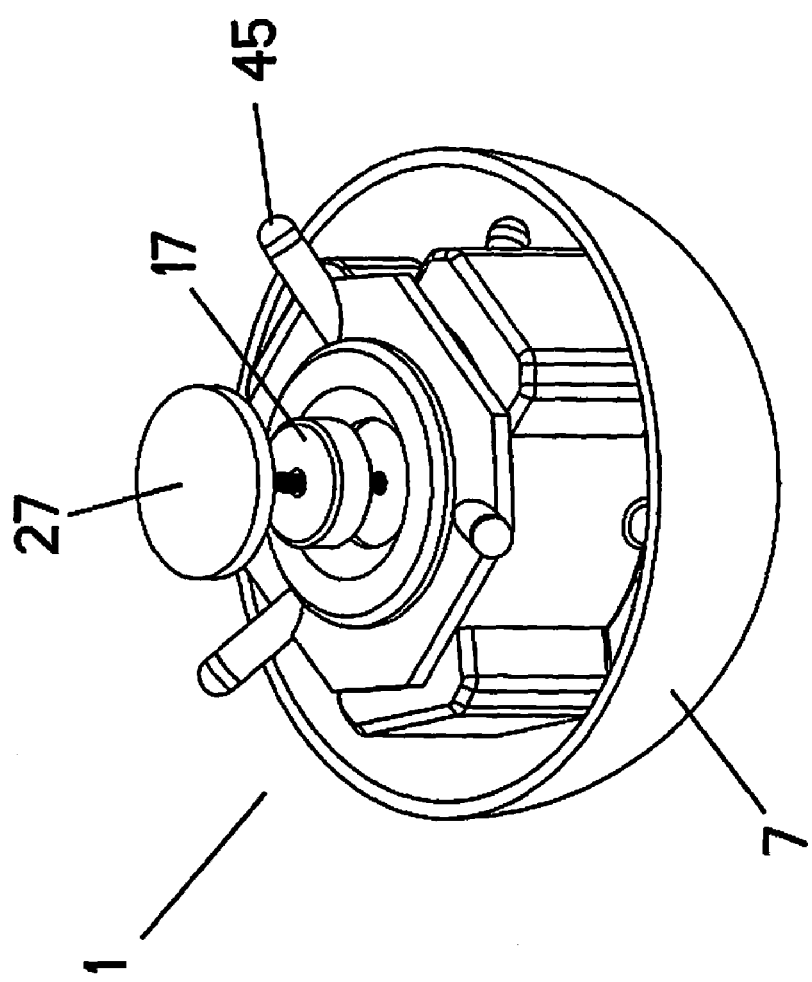
FIG. 9 is a partial perspective view of the piston embodiment of the self-balancing remote sensing device of the present invention, illustrating the disposition of the pancake jack screw motor and piston.

With regards to depth control, the device 1 utilizes a buoyancy control means to perform same, i.e., to alter the buoyancy of the device 1, the buoyancy control means being in direct or indirect attachment with the inner structure and communication with the computer processor. In a preferred embodiment, as illustrated in FIGS. 4 and 5, the buoyancy control means is comprised of a piston cavity 29 disposed within or formed integral with the interior portion of the sphere, preferably within the lower hemisphere 9 thereof or formed integral with the hollow outer sphere. A piston 27 is disposed within the water-tight piston cavity 29, the piston being driven by an actuator means, such as a jackscrew, as illustrated in FIGS. 4, 5 and 9. In alternative preferred embodiments, the actuator means 21 may be one or more of a linear actuator, and a scissor mechanism (not shown).

A motor means 17, such as a pancake jack screw motor, is in communication with the actuator means 21 and computer processor 47, and is operable to actuate the actuator means 21 upon command by the computer processor 47. As illustrated in FIGS. 4 and 5, by moving the piston 27 back and forth within the piston cavity 29, the volume of the cavity 29 is altered, thereby altering the buoyancy of the device 1. Of course, the motor means 17 may be configured appropriately drive any linear actuator means 17, whether it is the preferred jackscrew, linear actuator, scissors mechanism, or any other conventional means of actuation.

In another preferred embodiment, as illustrated in FIGS. 2 and 3, the buoyancy control means is comprised of the piston cavity 29 mentioned above. However, rather than provide a water-tight piston cavity as above, a bellows 19 is disposed within the piston cavity 29. An actuator means 21, driven by the motor means 17, is disposed in communication with the bellows 19, so as to extend and retract the bellows 19, thereby altering the buoyancy of the device 1.

In addition to, or instead of, the buoyancy control means described above, as illustrated in 5, comprises a valve 67 disposed within or adjacent to the hollow outer sphere. The valve 61 is operable to permit flow of liquid and/or gases into and/or out of the hollow outer sphere. The valve 61 may be configured so as to be pressure sensitive, using conventional pressure sensitive valve components, so as to automatically open and close at preset times/conditions, thereby allowing liquids and gasses to enter and exit the device (thereby altering buoyancy thereof). However, preferably, the valve 67 is in communication with the computer processor 47, so as to be intelligently controlled thereby. Thus, the valve 67, like the buoyancy control means described above, may be actuated at any time as desired by the user, via the computer processor, to cause the device 1 to ascend and descend as desired.

In addition to the sensors, as illustrated in FIG. 2, one or more illumination sources 61 may be provided, the illumination sources being in communication with the computer processor 47 and power supply 15. The illumination sources (devices) 61 may be any conventional light source capable of allowing users, or any desired parties, to detect the presence of the devices 1. For example, an operator may transmit a command to all devices 1 within a specific geographic area to order the devices 1 to illuminate their illumination sources, thereby allowing detection and retrieval (if desired). In a preferred embodiment, the illumination sources 61 are one or more of an LED, IR LED, an incandescent bulb, a fluorescent bulb, and an electro-photo luminescent device. In the case of an IR LED or other IR light source, random detection of the devices 1 by monitored targets is unlikely. Thus, in covert applications, IR light sources are desirable.

Figure 15:
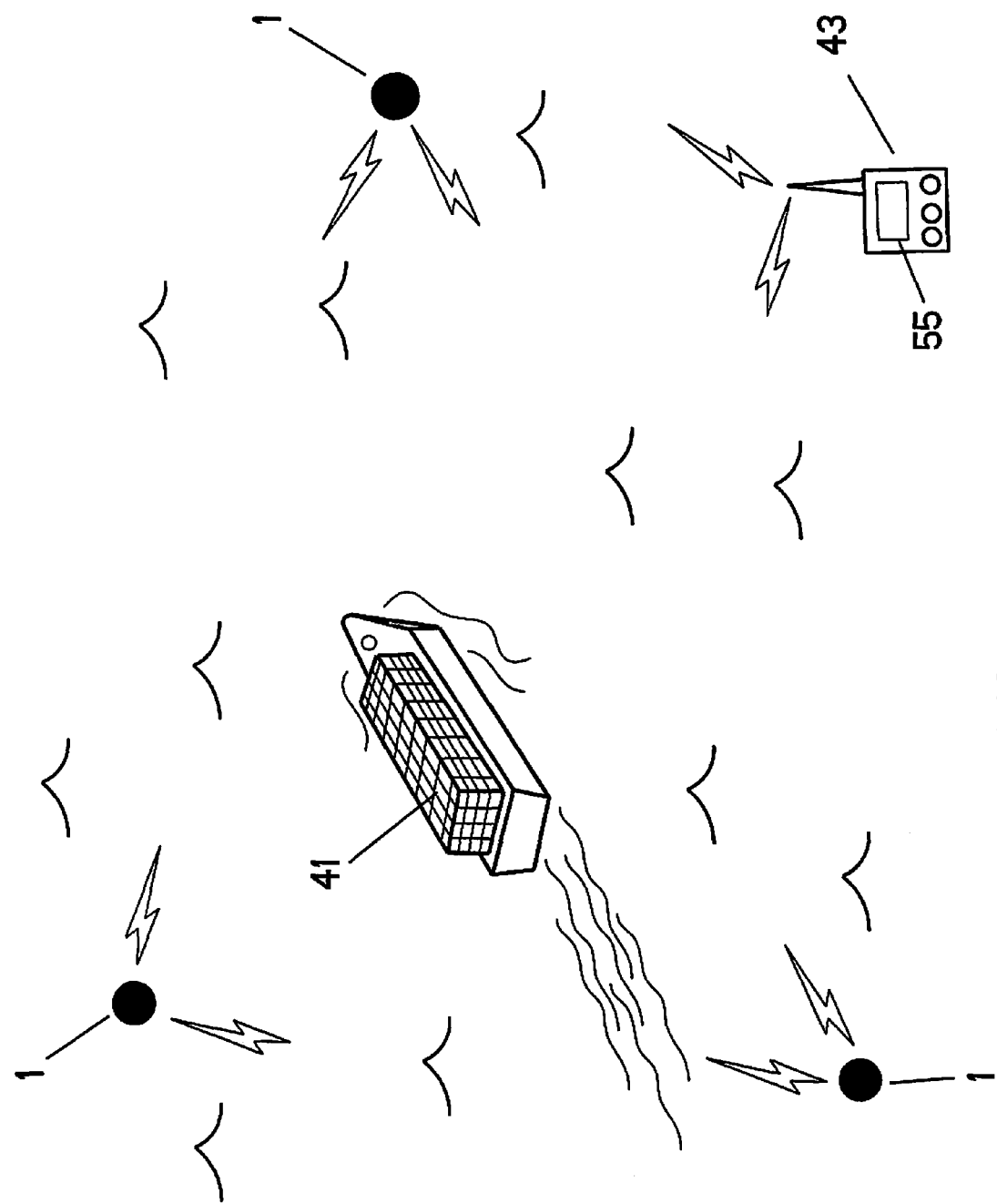
FIG. 15 is an aerial view of a maritime environment, illustrating a maritime viewing target (ship) being monitored by the remote sensing system of the present invention.
Figure 16:
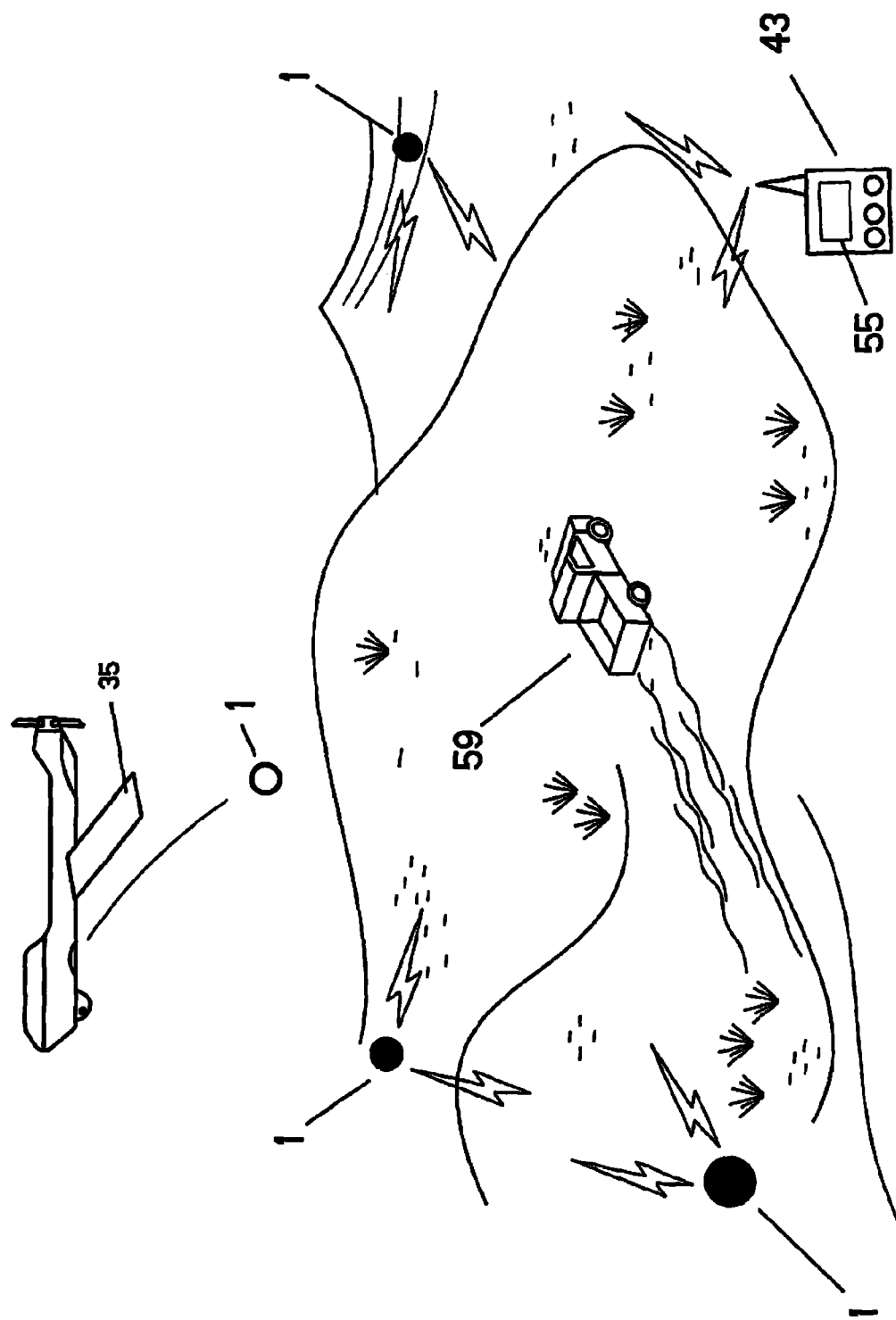
FIG. 16 is an aerial view of a terrestrial environment, illustrating the delivery of self-balancing remote sensing device(s) of the present invention via a UAV, and the remote monitoring of a land based target (truck) by the remote sensing system of the present invention.

To enable control of the functions of the device 1, a mobile computer program product (computer software application), stored on the computer readable storage medium, is provided, the computer program product embodying computer usable program code for receiving and processing data received by one or more of the cameras and sensors. In particular, the computer program product is operable to receive one or more of video, photographic, geographic and sensed data; execute commands stored on the computer readable storage medium; and transmit commands to one or more of the cameras, sensors, buoyancy control means, illumination devices and valve. Further the computer program product (computer software application) enables transmission of the sensed data from the device 1 to the base station 43, as illustrated in FIGS. 15 and 16, and/or to other devices in the system.

In a further preferred embodiment, the mobile computer program product is further operable to receive and execute externally received commands. For example, an operator/user may transmit commands to the device to ascend/descend, alter the times/rate/depth of descent/ascent, to command the device to "push" sensed data to the base station 43 on command, upon detection of predetermined sensed data and/or at timed intervals, etc. In addition, the mobile computer program product is preferably operable to authenticate received external commands, so as to prevent unauthorized operation/control of the devices 1.

In another preferred embodiment, the mobile computer program product is further operable to delete stored data upon determination of one or more predefined parameters or upon receipt of an authenticated external command. This function allows prevention of access to sensitive data by unauthorized entities.

As mentioned above, and as illustrated in FIGS. 15 and 16, the remote sensing device 1 may form a portion of a network (system) of sensing devices. In such a case, the mobile computer program product is further operable to receive and store data received from other remote sensing devices, and transmit same in peer-to-peer communications. This function allows the devices to form an ad hoc network of remote sensing devices, thereby extending the range of the system. In particular, a remote sensing system is provided comprising one or more remote sensing devices 1, and one or more stationary and/or mobile base stations 43.

Each base station, which may be stationary and/or mobile, comprises a central computer processor, a central computer readable database in communication with the central computer processor, and a wireless communication means in communication with the central computer processor. As with the device 1, the computer processor of the base station 43 may be any conventional CPU capable of executing the base computer program product described below.

Further, the central computer readable database may be any computer-usable or computer readable medium or apparatus that can contain, store, communicate, propagate, or transport the program for use by or in connection with the instruction execution system, apparatus, or device. For example, the database can be an electronic, magnetic, optical, electromagnetic, infrared, or semiconductor system (or apparatus or device) or a propagation medium. Exemplary databases are flash memory, semiconductor or solid state memory, magnetic tape, a removable computer diskette, a random access memory (RAM), a read-only memory (ROM), a rigid magnetic disk and an optical disk.

Each base station 43 is operable to receive one or more of video, photographic, geographic and sensor data transmitted from one or more of the remote sensing devices 1. Further, in a preferred embodiment, one or more of the base stations (the system may be comprised of one or a plurality thereof) comprises a video display means (graphical user interface) 55 in communication with the central computer processor of the base station, thus allowing graphical representation of received sensed data/information and ease of control of the system to the user/operator.

The base computer program product (computer software application), which is stored on the central computer readable database is embodied by computer usable program code, and operable to manage data received from one or more of the base stations 43 and/or from one or more of the remote sensing devices 1, as well as, in a preferable embodiment, to enable control of operation of the devices 1. In particular, the base computer program product operable to receive one or more of video, photographic, acoustic, environmental, chemical, radiological and geographic data transmitted from one or more of the remote sensing devices 1, and in a preferred embodiment, to analyze same.

In a preferred embodiment, the base computer program product is further operable to enable transmission of one or more user commands to one or more of the remote sensing devices 1. These user commands may include, for example, buoyancy commands, which are operable to actuate the motor means 17 so as to alter the buoyancy of the remote sensing devices 1. Further, the user commands may include sensor commands operable to activate and/or deactivate one or more of the camera 5 and sensors. In another example, the user commands may include data commands operable to command the remote sensing device computer processor 47 to transmit sensed data to the central base station 43.

Further, like the mobile computer program product, the base computer program product is further operable to receive and store data received from remote sensing devices 1 and/or other base stations 43, and transmit same in peer-to-peer communications. Thus, like the devices 1, the base computer program product may participate in forming an ad hoc network of remote sensing devices and base stations. For example, a plurality of base stations 43 (which generally have greater transmission ranges than the individual devices 1) may be utilized in the system, thereby greatly extending the range/coverage of the remote sensing capabilities of the system.

Moreover, both the mobile computer program product and the base computer product are operable to "sync" with the network/system. Specifically, both computer programs are operable to periodically transmit data, including one or more of video, photographic, geographic and sensed data, to an external source such as other devices, base stations, relay stations, etc. This transmission of data enables prevention of the loss of data when a node (such as a device or base station) is damaged, lost or destroyed. For example, a device may be programmed to transmit all or only a predefined set of data to the nearest base station, device within an ad hoc network of devices, or the network as a whole, on a periodic time schedule. Alternatively, a device may be programmed to transmit data to one or more of a base station, a device, or the network as a whole when received predefined sensed data (such as a particular acoustic signature, predetermined level of radioactivity, etc.).

Figure 12:
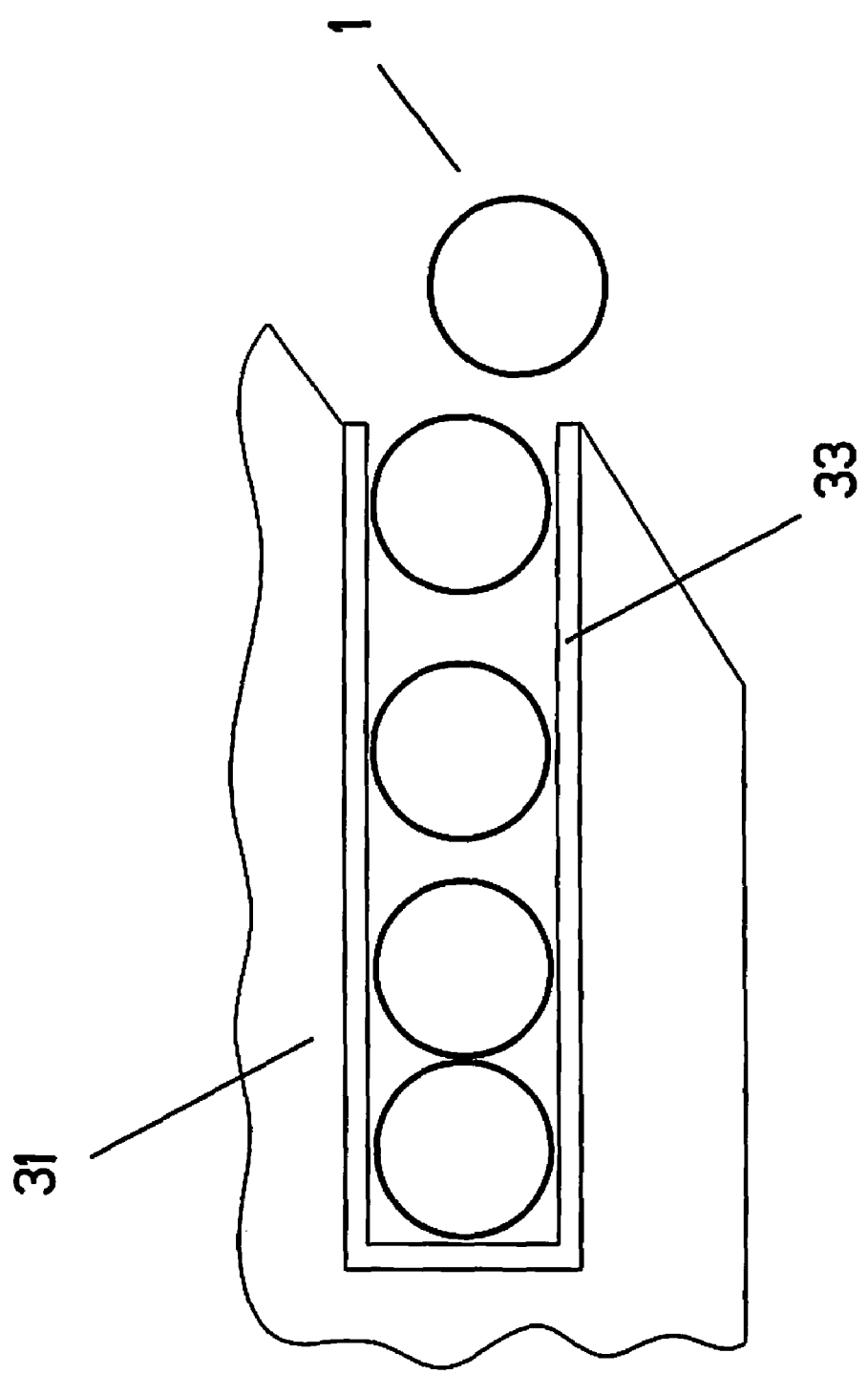
FIG. 12 is a partial cross-sectional view of a delivery means body and tube/carrier provided to retain and deliver the self-balancing remote sensing device(s) of the present invention.
Figure 13:
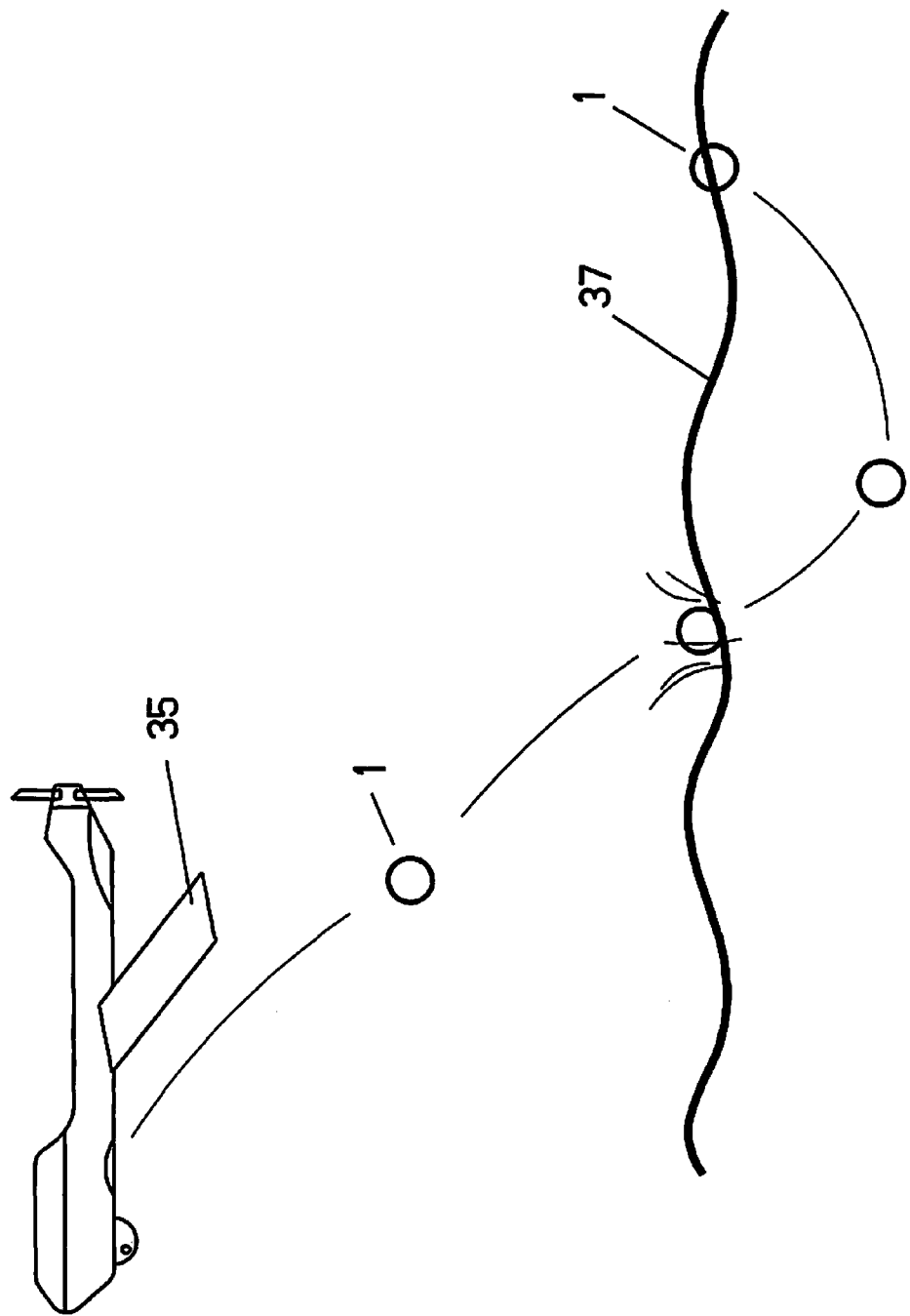
FIG. 13 is an illustrative view of a UAV/flying delivery means operable to deliver the self-balancing remote sensing device(s) of the present invention, wherein the devices are being aerially deployed in a maritime environment.
Figure 14:
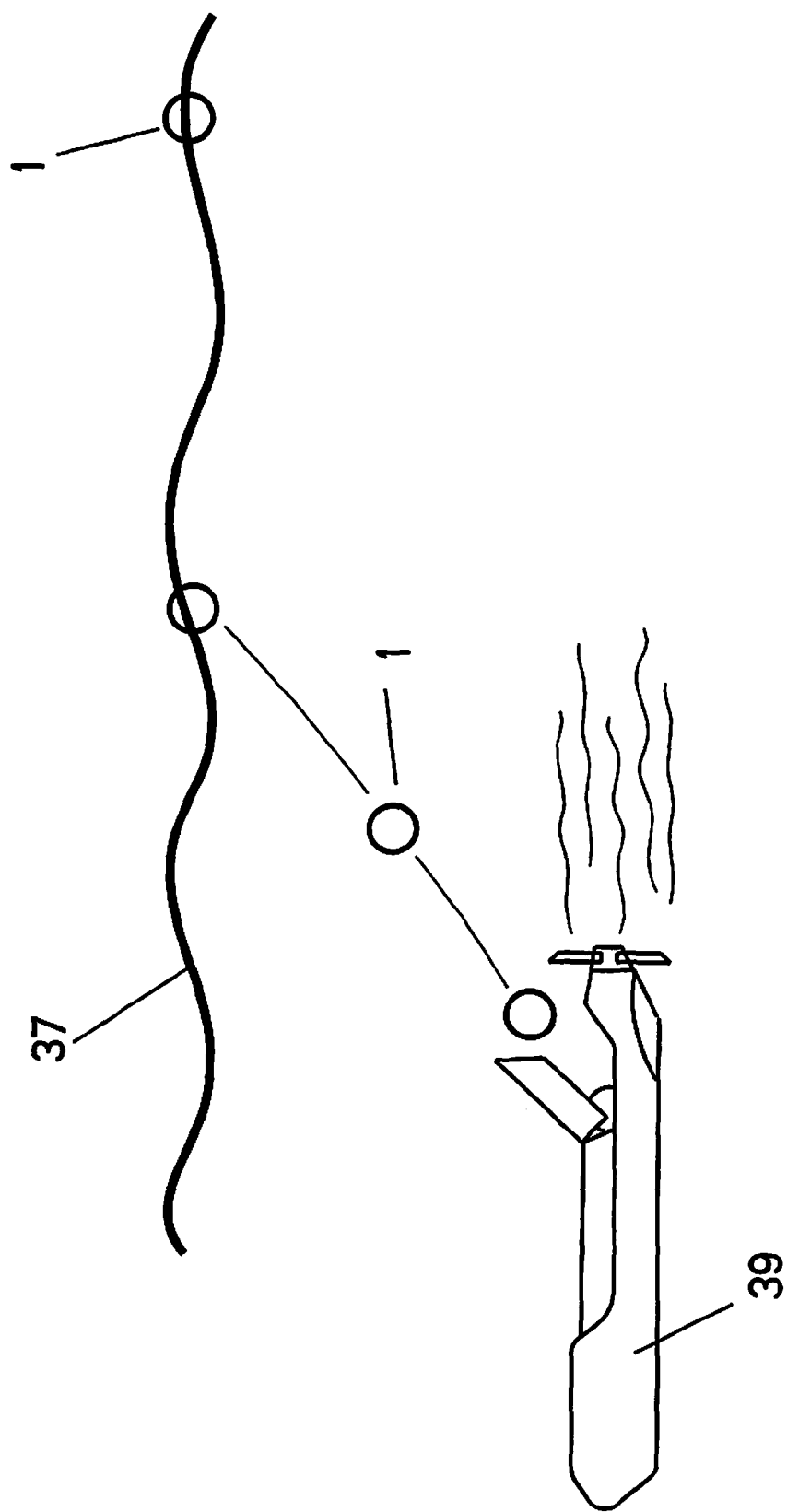
FIG. 14 is an illustrative view of a submarine/underwater delivery means operable to deliver the self-balancing remote sensing device(s) of the present invention, wherein the devices are being deployed in a maritime environment.

As mentioned above, one great advantage of the self-balancing remote sensing devices 1 and system of the present invention is the ease of deployment/formation. For example, as illustrated in FIG. 12, the remote sensing devices 1 may be contained/stored in a delivery means body 31, such as a tubular device, which can then be loaded on any appropriate delivery vehicle. The delivery vehicle may be chosen according to the environment to be remotely sensed. In exemplary maritime and terrestrial embodiments, as illustrated in FIGS. 13 and 16, respectively, when desiring quick, wide area delivery, the devices 1 may be dispersed/deployed from a flight vehicle, such as UAV 35. Alternatively, as illustrated in FIG. 14, when covert operation is desired, the devices 1 may be deployed from an underwater vehicle, such as a submarine 39.

Although specific embodiments of the present invention have been disclosed herein, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

LIST OF DRAWING ELEMENTS

1: self-balancing remote sensing device
3: solar panels
5: camera
6: inner structure
7: upper hemisphere
8: projections
9: lower hemisphere
11: mounting frame
13: inner volume
15: battery/ballast weight
17: motor means
19: buoyancy bellows
21: actuator means
23: bellows
25: piston outer volume
27: piston
29: piston cavity
31: delivery means body
33: tube/carrier of devices
35: UAV/flying delivery means
37: water surface
39: submarine/underwater delivery means
41: maritime viewing target
43: base station
45: roller contacts
47: onboard CPU/computer processor
49: temperature sensor
51: GPS receiver
53: transceiver
55: CPU means
57: salinity sensor
59: land-based target
61: illumination source
63: induction charging pad
65: induction charger
67: valve
69: neutron detector and/or Geiger counter

What is claimed is:

1. A free floating self-balancing remote sensing device for covert monitoring of both terrestrial and maritime environments consisting of:
   (a) a hollow outer sphere, at least a portion of which is comprised of a transparent material, said sphere defining an interior portion;
   (b) an inner structure disposed within the interior portion of the hollow outer sphere, the inner structure having three or more projections formed integral therewith or attached thereto, each of said projections having one or more races and/or ball bearings rollably disposed at or in an end of the projection, or a low friction surface formed at the end, so as to enable the inner structure to roll within the hollow outer sphere;
   (c) a computer processor attached to and/or indirectly supported by the inner structure;
   (d) one or more cameras selected from the group consisting of a video camera, digital camera, IR camera, and thermal imaging camera in communication with the computer processor, said one or more cameras having a lens disposed adjacent a portion of the hollow outer sphere being comprised of a transparent material, said cameras being rotatable or tiltable, and/or the lens being zoomable, and said cameras comprise a video/photo control means in communication with the lens and/or camera, said video/photo control means being capable of controlling the movement of the one or more cameras and/or the zooming of the lenses thereof;
   (e) a GPS receiver and one or more sensors selected from the group consisting of acoustic, chemical, radiation, motion detector, neutron, light meter, temperature, and pressure sensors, said receiver and sensors being in communication with the computer processor;
   (f) one or more illumination devices in communication with the computer processor and a power supply, the illumination devices being selected from the group consisting of an LED, IR LED, an incandescent bulb, a fluorescent bulb, and an electro-photo luminescent device;
   (g) a transceiver in communication with the computer processor, said transceiver operable to wirelessly transmit photographic data, video images, geographic location data and sensed data; and
   (h) one or more depth sensors in communication with the computer processor; and a buoyancy control means in direct or indirect attachment with the inner structure and in communication with the computer processor, said buoyancy control means operable to alter the buoyancy of the remote sensing device so as to cause the remote sensing device to descend or ascend in the water, and a valve disposed within or adjacent to hollow outer sphere which is operable to permit flow of liquid and/or gases into and/or out of said hollow outer sphere, and said valve being in communication with the computer processor;
   (i) a computer readable medium in communication with the computer processor, with a mobile computer program product stored on the computer readable storage medium, said computer program product embodying computer usable program code for receiving, processing and transmitting data received by one or more of the said cameras, GPS receiver, and/or sensors, said computer program product operable to execute commands stored on the computer readable storage medium, and transmit commands to one or more of the cameras, sensors, buoyancy control means, illumination devices and said valve, and, said mobile computer program product being operable to receive external commands, authenticate received external commands, and execute external commands, delete stored data upon determination of one or more predefined parameters or upon receipt of an authenticated external command, and/or transmit an open/close command to the valve so as to permit inflow or outflow of gases and/or liquids; and
   (j) a power supply in conductive communication with the computer processor, said power supply comprised of one or more of a battery and/or fuel cell together with a charging means selected from the group consisting of an inductive charging mechanism, piezoelectric device operable to recharge the power supply, and one or more solar panels within the interior portion of the sphere adjacent the transparent portion,
   wherein the inner structure is balanced such that the video camera and/or digital camera tends to rotate into an upright position by action of gravitational forces.

2. The self-balancing remote sensing device of claim 1, wherein the buoyancy control means is comprised of:
   (i) a chamber disposed within the interior portion of the hollow outer sphere, or formed integral with the hollow outer sphere;
   (ii) a piston disposed within the chamber;
   (iii) an actuator means in communication with the piston; and
   (iv) a motor means in communication with the actuator means and computer processor, said motor means operable to actuate the actuate means upon command by the computer processor so as to drive the piston back and forth within the chamber to alter the buoyant volume of the remote sensing device, thereby altering the buoyancy of the device.

3. The self-balancing remote sensing device of claim 1, wherein the buoyancy control means is comprised of:
   (i) a chamber disposed within the interior portion of the hollow outer sphere, or formed integral with the hollow outer sphere;
   (ii) a bellows disposed within the chamber;
   (iii) an actuator means in communication with the bellows; and
   (iv) a motor means in communication with the actuator means and computer processor, said motor means operable to actuate the actuator means upon command by the computer processor so as to extend and retract the bellows to alter the buoyant volume of the remote sensing device, thereby altering the buoyancy of the device.

4. The encapsulated remote sensing device of claim 3, wherein the actuator means is comprised of one or more of a screw jack, a linear actuator, and a scissor mechanism.

* * * * *